United States Patent
Wooten (12) 
(10) Patent No.: US 6,327,308 B1
(45) Date of Patent: *Dec. 4, 2001

(54) ASYNCHRONOUS DIFFERENTIAL COMMUNICATION

(75) Inventor: David R. Wooten, Spring, TX (US)

(73) Assignee: Compaq Computers Corporation, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/858,774

(22) Filed: May 19, 1997

Related U.S. Application Data (63) Continuation of application No. 08/485,814, filed on Jun. 7, 1995, now Pat. No. 5,712,875.

(51) Int. Cl.[7] .................................................. H04B 3/00
(52) U.S. Cl. ............................................................. 375/257
(58) Field of Search ....................... 375/257, 258; 327/171; 326/86, 90; 307/412, 127, 130

(56) References Cited

U.S. PATENT DOCUMENTS

| | | | | |
|---|---|---|---|---|
| 4,216,426 | * | 8/1980 | Flora | 375/257 |
| 4,271,526 | * | 6/1981 | Flora | 375/257 |
| 4,385,394 | * | 5/1983 | Pace | 375/257 |
| 4,399,530 | * | 8/1983 | Demange et al. | 375/257 |
| 5,287,386 | * | 2/1994 | Wade et al. | 375/257 |
| 5,485,488 | * | 1/1996 | Van Brunt et al. | 375/257 |
| 5,519,728 | * | 5/1996 | Kuo | 375/257 |
| 5,872,813 | * | 2/1999 | Hui | 375/257 |

\* cited by examiner

*Primary Examiner*—Don N. Vo
(74) *Attorney, Agent, or Firm*—Conley, Rose & Tayon, P.C.

(57) ABSTRACT

Information is sent on a pair of conductors by sending some of the information by driving the pair of conductors in accordance with a primary signaling character set having two distinct information-carrying characters, and sending other information by driving the pair of conductors in accordance with a third distinct information-carrying character represented by a predefined state of the pair of conductors.

27 Claims, 5 Drawing Sheets

ASYNCHRONOUS DIFFERENTIAL COMMUNICATION

This is a continuation of application Ser. No. 08/485,814, filed Jun. 7, 1995 which is now U.S. Pat. No. 5,712,875.

BACKGROUND

This invention relates to asynchronous differential communication.

Asynchronous communication, where a digital signal is sent from a transmitter and collected at a receiver, one direction at a time, requires that the start and stop of each message by unambiguously delimited. In most schemes, a certain number of extra bits are added to each message to accomplish this delimiting. These extra bits use available communication bandwidth.

Figure 1:
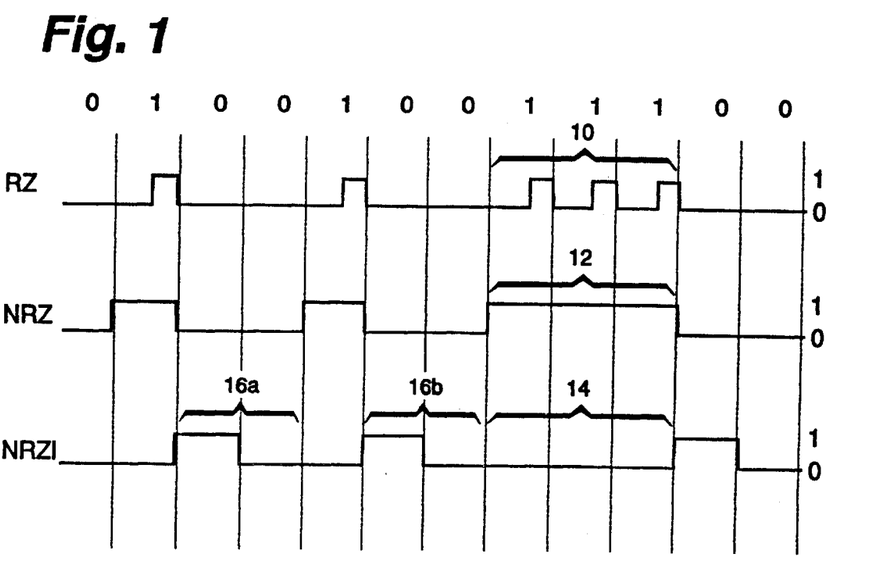
FIG. 1 is a signal timing diagram of signaling protocols.

A variety of signaling protocols are used in asynchronous communication. Referring to FIG. 1, Return to Zero (RZ) signaling indicates a logical 1 by raising the signal to an upper threshold voltage level, and then falling to a lower voltage level representing a 0 state, within one clock period. Successive logical ones (10) are each separated by these returns to zero. The No Return to Zero (NRZ) protocol signals a logical 1 by raising the signal to an upper threshold voltage at the falling edge of a clock period. No Return to Zero does not separate successive logical ones (12) with returns to zero. The No Return to Zero Inverse (NRZI) protocol signals a logical zero by a change of state at the rising edge of a clock period. A logical one is represented by not changing the state at the rising clock edge. Thus, successive logical ones (14) exhibit no change of state, while successive logical zeroes (16a, 16b) indicate a change of state at each clock period.

Figure 2A:
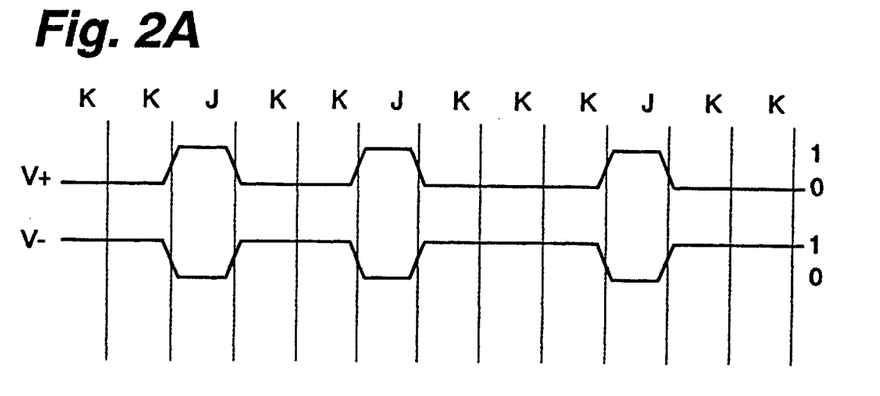
FIG. 2A is a signal timing diagram for differential signaling.
Figure 2B:
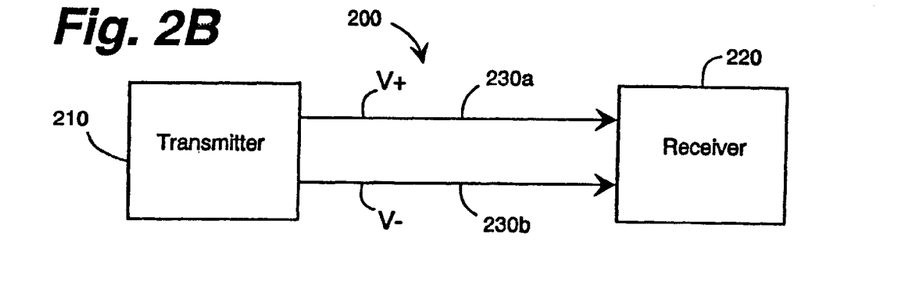
FIG. 2B is a block diagram of a differential signaling circuit.

Each of the described protocols can be sent over the same hardware-level communication line. When sending digital messages at high speeds (for example, greater than $10^6$ bits per second) between relatively distant transmitters and receivers, differential signaling is preferred due to its greater noise immunity and tolerance of voltage offsets. Hardware differential signaling system 200 is illustrated in FIGS. 2A and 2B, where one wire 230a from transmitter 210 carries a $V^+$ signal to receiver 220, and another wire 230b carries an inverse $V^-$ signal, and these two signals inversely mirror each other as in FIG. 2A. Since noise and voltage drifts tend to affect both differential wires 230a and 230b similarly, their relative signal voltages tend to remain synchronized, even if their absolute voltages tend to float. The relative voltages on the two signals $V^+$ and $V^-$ define two distinct states for the differential wires: a J state, customarily defined as $V^+$ higher than $V^-$, and a K state, defined as $V^+$ lower than $V^-$. For Return to Zero and No Return to Zero signaling, the J state can be assigned as a logical one, and the K state can be assigned as a logical zero. For example, to implement No Return to Zero signaling, receiver 220 need only detect which of $V^+$ and $V^-$ is higher than the other at each clock period.

As a further simplification, serial asynchronous bus transmission lines in computers often use No Return to Zero Inverse (NRZI) signaling using differential signaling hardware. Since NRZI assigns logical zero to a change in signal, and logical one to no change, NRZI differential signaling requires that receiver 220 only determine whether signal $V^+$ has crossed signal $V^-$, and not which signal wire is at a higher voltage than the other. In NRZI, any transition from state J to state K connotes a logical zero, while any persistence in either state J or state K connotes a logical one.

Data recovery of NRZI signals requires that the receiver use a clock running at a higher frequency than the data rate to oversample the state of the signal lines. Oversampling allows a certain number of data transitions to be sampled before the actual data is sent, so that the detector clock can be locked onto the periodicity of the incoming data. Once the receiver's clock is locked, the data transmission proceeds with data 0's being transmitted by a change in the state of the signal line(s) and data 1's being transmitted by leaving the signal lines unchanged. To maintain phase lock, the protocol must allow for some means of inserting transitions when the data comprises a long string of logical 1's, and thus would not otherwise have transitions. Inserting transitions is often termed "bit stuffing."

For any use of differential signaling, in any signaling protocol, some way of delimiting messages is needed. If formatting information is embedded within the data stream, the transmission medium's efficiency declines. However, if embedded formatting information is not used, the usual way to detect the end of a message is to detect that the transmitter has stopped sending. A long string of data 1's can provide this, but the string must be longer than any string of 1's that might occur during normal transmission.

SUMMARY

In general, in one aspect, the invention features a method for sending information on a pair of conductors that comprises sending some of the information by driving the pair of conductors in accordance with a primary signaling character set having two distinct information-carrying characters, and sending other information by driving the pair of conductors in accordance with a third distinct information-carrying character represented by a predefined state of the pair of conductors.

Implementations of the invention may include the following features. The two distinct information-carrying characters of the primary set can be represented by transition conditions of the pair of conductors. One of the distinct information-carrying characters can be represented by a change in states of the pair of conductors, and the other can be represented by no such change in states. Or, the two distinct information-carrying characters can be represented by state conditions of the pair of conductors. One of the distinct information-carrying characters of the primary set can be represented by a first predefined state of the pair of conductors, and the other information-carrying character can be represented by a second state of the pair of conductors. The first state can correspond to the first conductor being in a logical high state and the second conductor being in a logical low state, and the second state can correspond to the first conductor being in a logical low state and the second conductor being in a logical high state. Any transition from the first state to the second state and vice-versa may require temporarily driving the pair of conductors to a putative state, which can correspond to either both the first conductor and the second conductor being in a logical high state, or both the first conductor and the second conductor being in a logical low state. The third distinct information-carrying character can correspond to either both the first conductor and the second conductor being in a logical high state, or both the first conductor and the second conductor being in a logical low state, in opposite fashion to the putative state. The third distinct information-carrying character can be used to represent an end-of-message delimiter.

In general, in another aspect, the invention features apparatus for sending information on a pair of conductors that comprises a transmitter connected to the pair of conductors, the transmitter sending some of the information by driving the pair of conductors in accordance with a primary signaling character set having two distinct information-carrying characters, and a secondary driver connected to the pair of conductors, the secondary driver sending other information by driving the pair of conductors in accordance with a third distinct information-carrying character represented by a predefined state of the pair of conductors.

In general, in another aspect, the invention features apparatus for detecting information on a pair of conductors that comprises a receiver connected to the pair of conductors, the receiver detecting some of the information on the pair of conductors in accordance with a primary signaling character set having two distinct information-carrying characters, and a secondary detector connected to the pair of conductors, the secondary detector detecting other information on the pair of conductors in accordance with a third distinct information-carrying character represented by a predefined state of the pair of conductors.

In general, in another aspect, the invention features a method for providing three signal states in a pair of signaling wires that comprises first providing a first signal on a first signaling wire, providing a second signal on a second signaling wire, both the first and the second signals having a maximum voltage, a minimum voltage and a midpoint voltage, the first and second signals crossing at a crossing voltage at a plurality of points in time, and finally maintaining the crossing voltage at either greater than a threshold voltage and less than the maximum voltage, or less than the threshold voltage and greater than the minimum voltage, the threshold voltage being different than the midpoint voltage.

Implementations of the invention may include the following features. The crossing voltage may be maintained by delaying the falling edges of the first signal and the second signal, or by delaying the rising edges of the first signal and the second signal. The invention may further comprise detecting three states of the first and second signals: state one, when the first signal is above the threshold voltage and the second signal is below the threshold voltage, state two, when the first signal is below the threshold voltage and the second signal is above the threshold voltage, and state three, when the first signal and the second signal are either both above the threshold voltage or both below the threshold voltage.

Among the advantages of the invention are the following. Message character sets can be increased to three distinct information-carrying characters. The third character can be employed as a simple one bit message delimiting character. Asynchronous communications can be unambiguously completed with a single delimiting bit. A simple logical circuit can function both to generate the required asynchronous paired signals, and to detect these signals. The provision of these three information-carrying characters can be used in any signaling protocol.

Other advantages and features will become apparent from the following description and from the claims.

DESCRIPTION

Figure 3:
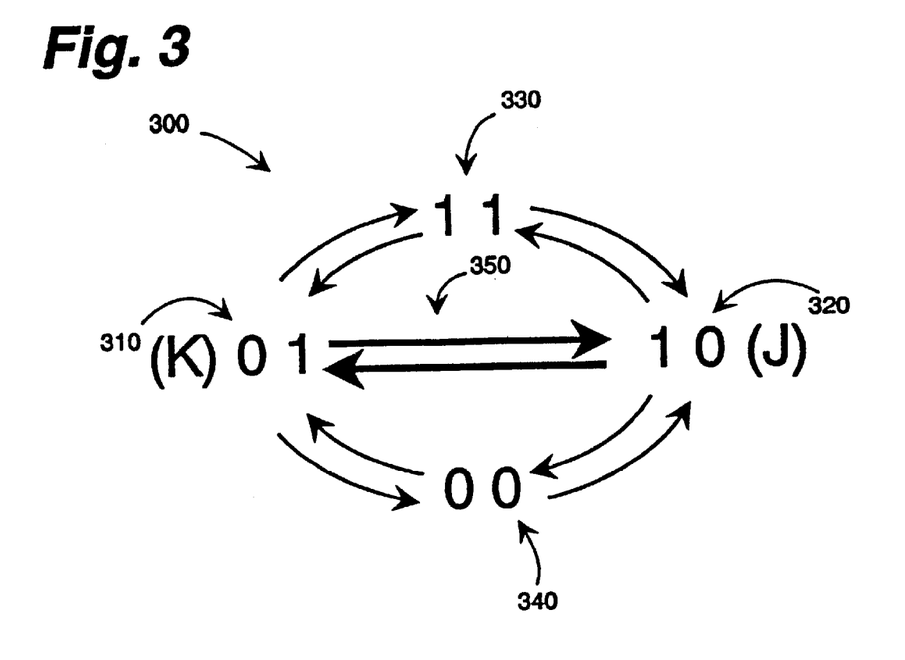
FIG. 3 is a state diagram for differential signaling.
Figure 4:
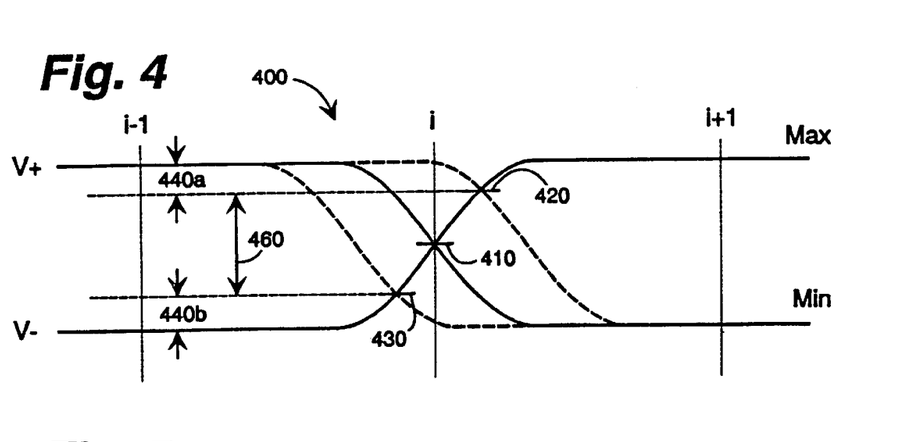
FIGS. 4, 5 and 6 are signal timing diagrams for differential signaling.

Referring to the state diagram 300 of FIG. 3, the two wires used in differential signaling actually have 4 unique states. The two states where one wire is high while the other is low (0-1 and 1-0, states J (310) and K (320)) are the primary states used for actual message transmissions, as in FIG. 2A. The two other states, where the wires are both high (1-1) or both low (0-0) (states 330 and 340), are not ordinarily used for information-carrying purposes. The reason for this can be seen in the signal diagram 400 of FIG. 4. Differential signals are changed by the crossing of one signal with another during a clock period. Just before period i, $V^+$ is high, while $V^-$ is low. To signal a change in state, $V^+$ changes to low, while $V^-$ changes to high. At clock moment i, the two signals nominally cross at mid-point 410. However, phase and/or voltage drifts can cause the two signals to cross somewhat higher (420) or somewhat lower (430) than in the middle. Ordinarily, phase shifts that cause a change in the crossing voltage do not affect message detection. To register a change from logical one to logical zero, the receiver only needs to detect either (a) that the signals have crossed (as in NRZI) or (b) the relative voltages on the two signals (as in RZ and NRZ), and not the particular crossing voltage.

Use of the other states (1-1 and 0-0) for signaling complicates this scheme, since the crossing at 420 (from 1-0 to 0-1) can be confused with an unchanging 1-1 signal (i.e., in no transition region 440a), as both signals are then high. Likewise, the crossing at 430 can be confused with an unchanging 0-0 signal (i.e., in no transition region 440b), since both signals are then low. State diagram 300 shows this: in differential signaling, the transition from one state (e.g., 0-1) to another (e.g., 1-0) often involves transitional states 1-1 and 0-0. The direct path 350, which relates to a mid-point crossing threshold such as 410, is difficult to reliably enforce and detect. Thus, a range of transition voltages 460 is usually allowed.

Figure 7:
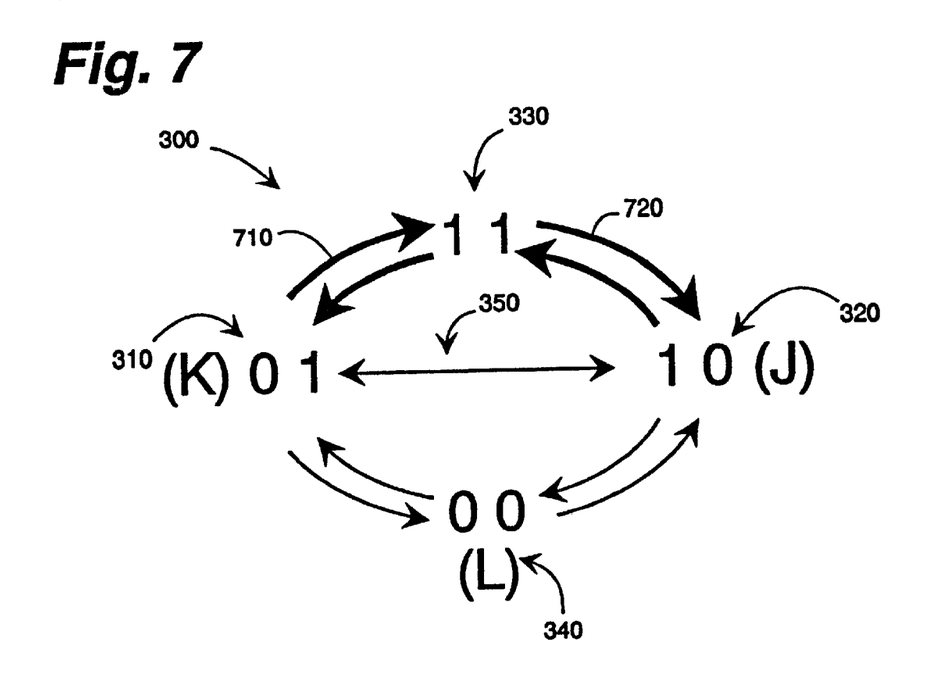
FIG. 7 is another state diagram for differential signaling with an altered crossing threshold.

The differential signaling protocol can be changed so that at least one of the other states (0-0 or 1-1) can also be used for signaling. Referring to the signal diagram 500 of FIG. 5, the threshold for detecting signal crossing is raised to some point 520, a point higher than the conventional midpoint 410. The forcing of the signal crossing at this higher threshold can be accomplished by deliberately delaying the falling edge of one of the signals to occur at a time $\Delta i$ after clock moment i, such as with $V^+$ in FIG. 5, while not delaying the rising edge of the other signal $V^-$. (This is just like the case shown by the dotted signal $V^+$ crossing through threshold 420 in FIG. 4, there due to an unwanted phase shift). In effect, the transmission delimiting method forces all transitions to take the upper route from 0-1 through 1-1 to 1-0, as shown in heavier arrows in FIG. 7. When the 1-1 state is detected at i+$\Delta i$, it is interpreted as a transitional (or "putative") state only.

Since the 1-1 transitional state has been reserved for all transitions, and because 1-1 values at time i+$\Delta i$ may be reliably distinguished from 0-0 values, the 0-0 state can be used to signal the end of messages. As shown in the signal diagram 600 of FIG. 6, when both V⁺ and V⁻ are less than the upper threshold crossing 520, the 0 states of both signals are unambiguously resolved into a 0-0 state. (The scheme has the V⁻ signal temporarily increase above threshold 520 before falling together with the V⁺ signal, but this is not necessary). This 0-0 state 340 is denoted L in FIG. 7.

Since the delimiting scheme provides 0-0 as a legitimate state for hardware differential signaling system 200, it can be used to signal the end of a message, with only one bit. The delimiting scheme can be used with any length messages to reliably end communications without appreciable bandwidth overhead.

Figure 8:
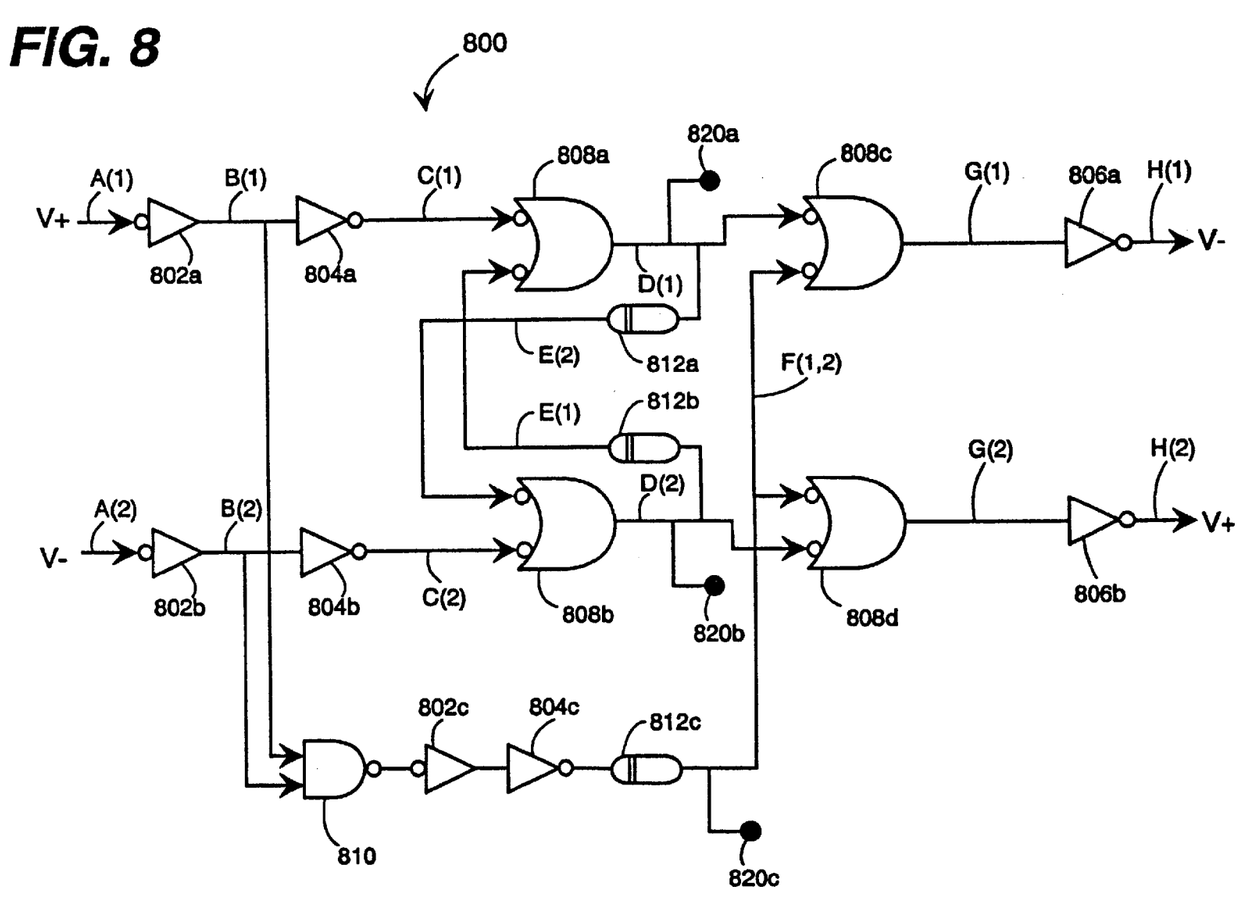
FIG. 8 is a block diagram of a circuit for generating and detecting the altered crossing threshold.

Referring to FIG. 8, apparatus 800 can be constructed with logical gates to provide the proper signal delays for generating both the 1-1 transition signal and the 0-0 message delimiting signal. Two interconnected paths connect an input V⁺ and V⁻ with an output V⁻ and V⁺ the signals propagate through circuit 800, the two signal lines flip in the vertical direction). Circuit 800 includes inverters 802, 804 and 806, OR gates with inverted inputs 808, NAND gate 810, and calibrated delay circuits 812 (which can be constructed of an even number of gates in series), connected as shown. Various circuit points have been labeled with lettered pairs A(1,2) through H(1,2). These circuit points correspond to the following tables I, II, and III, which illustrate the operation of circuit 800 in generating and detecting allowed state transitions. Circuit 800 functions in two ways. First, it can take a set of conventional differential signals and introduce appropriate time delays to falling signals to generate an increased crossing threshold 520. Second, key outputs 820a, 820b and 820c can be sampled to provide the unambiguous state of hardware differential signaling system 200, described further below.

Figure 5:
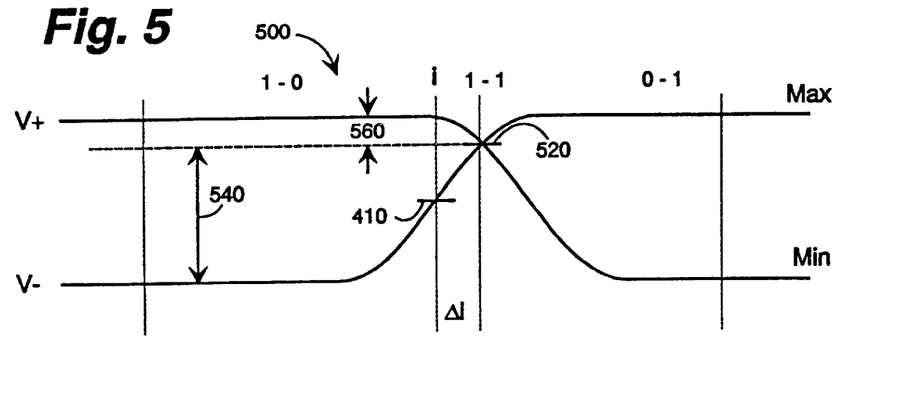

As seen in Table I, changing an input signal A(1) and A(2) (input V⁺ and V⁻ respectively) from 1-0 to 0-1 produces successive output signals for H(2) and H(1) (or output V⁺ and V⁻ respectively) of: 1-0, a temporary signal of 1-1 and a final signal state 0-1, exactly as in FIG. 5. Circuit 800 accomplishes this because time delays 812a and 812b feed output signals of OR gates 808a and 808b back to the respective inputs gates 808b and 808a, after a calibrated delay. This feedback process is reflected in Tables I, II, and III by the middle column representing the state of the system at an intermediate time t=1 before the transmission of the delayed signals E and F, whose delayed transmission leads to the final state at time t=1+delay shown in the final column.

Figure 6:
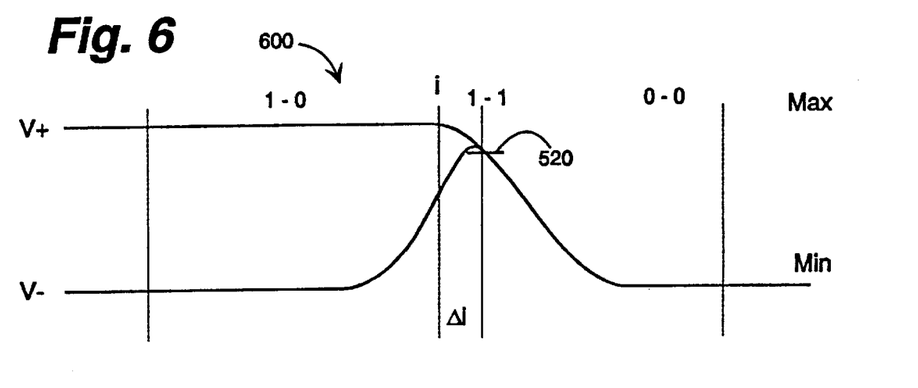
Figure 9:
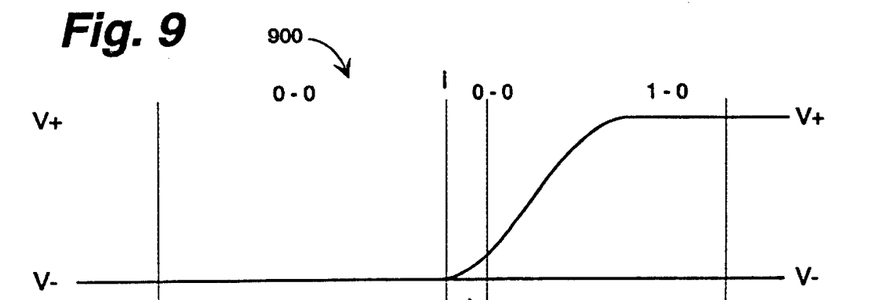
FIG. 9 is a signal timing diagram for differential signaling.

As shown in Table II, the same circuit 800 provides that changing an input signal from 1-0 to 0-0 produces successive output signals 1-0, a temporary signal of 1-1 (the transition signal) and a final signal state 0-0, exactly as in FIG. 6. As shown in Table III, circuit 800 provides that changing an input signal from 0-0 to 1-0 produces successive output signals of 0-0, a transition signal remaining at 0-0, and a final signal state 1-0. This transition, from end-of-message to new message, is shown in the signal timing diagram 900 of FIG. 9.

For detecting all the allowed states of the delimiting method (1-0, 0-1 and 0-0), the same circuit 800 can be employed. As shown in Tables I, II, and III, and referring to FIG. 8, outputs 820a and 820b (D(1) and D(2) respectively) are active low signals that are low only when the states of the signals are respectively 1-0 (J) or 0-1 (K). At all other times (1-1 or 0-0), 820a and 820b are inactive high. (See the bolded 0's and unbolded 1's in the rows for the D outputs). Similarly, output 820c (F(1,2)) is an active low signal that is low only when the state of the signals is 0-0 (L). At all other times (1-0, 0-1, or 1-1), 820c is inactive high. (See the bolded 0's and unbolded 1's in the rows for the F outputs). Thus, circuit 800 both generates appropriately phased differential signals that raise the crossing threshold, and also detects such signals.

Figure 10:
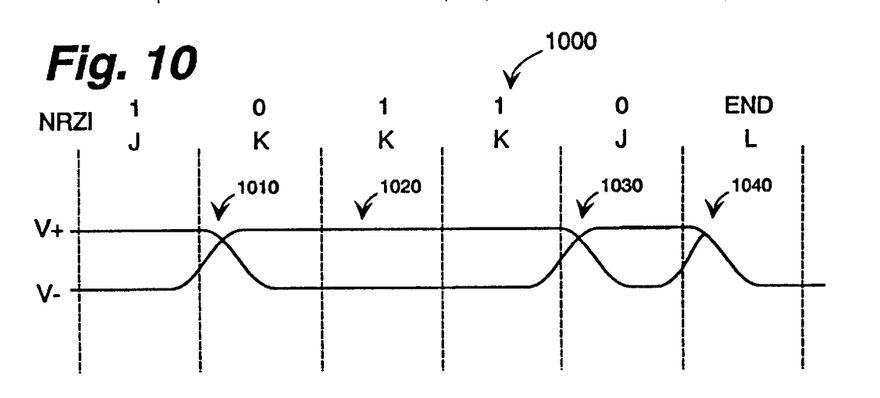
FIG. 10 is a signal timing diagram for an NRZI message with message delimiting.

Output signals 820a, 820b and 820c can be used to indicate the relative state of the differential wires (for Return to Zero and No Return to Zero protocols), or, by detecting changes between 820a and 820b, can be used for the No Return to Zero Inverse protocol. In any case, signal 820c can be used to indicate the end of a message. Referring to FIG. 10, a sample message 1000 using the NRZI protocol indicates logical zeroes with a change of states (for example, J to K at period 1010, K to J at period 1030) and a logical one by no change of states (for example, K to K at period 1020). The scheme indicates end-of-message with state L at period 1040.

Other embodiments are within the scope of the following claims. For example, the described scheme can work just as effectively by lowering the crossing threshold 520 to below the nominal midpoint crossing of the signals (410). This way, the 0-0 state becomes the transitional state and state 1-1 can be used as a delimiting signal state. Circuit 800 can be modified to accomplish this.

TABLE I

Creating and Detecting Transition from 1-0 to 0-1 through 1-1

| Signal Point | Initial State Time = 0 | Intermediate State Time = 1 | Final State Time = 1 + Delay |
|---|---|---|---|
| A(1): V⁺ | 1 | 0 | 0 |
| A(2): V⁻ | 0 | 1 | 1 |
| B(1) | 0 | 1 | 1 |
| B(2) | 1 | 0 | 0 |
| C(1) | 1 | 0 | 0 |
| C(2) | 0 | 1 | 1 |
| D(1) 820a | 0 << J | 1 | 1 |
| D(2) 820b | 1 | 1 | 0 << K |
| E(1) | 1 | 1 | 1 |
| E(2) | 0 | 0 | 1 |
| F(1) 820c | 1 | 1 | 1 |
| F(2) |  |  |  |
| G(1) | 1 | 0 | 0 |
| G(2) | 0 | 0 | 1 |
| H(1): V⁻ | 0 | 1 | 1 |
| H(2): V⁺ | 1 | 1 | 0 |

TABLE II

Creating and detecting Transition from 1-0 to 0-0

| Signal Point | Initial State Time = 0 | Intermediate State Time = 1 | Final State Time = 1 + Delay |
|---|---|---|---|
| A(1): V⁺ | 1 | 0 | 0 |
| A(2): V⁻ | 0 | 0 | 0 |
| B(1) | 0 | 1 | 1 |
| B(2) | 1 | 1 | 1 |
| C(1) | 1 | 0 | 0 |
| C(2) | 0 | 0 | 0 |
| D(1) 820a | 0 << J | 1 | 1 |
| D(2) 820b | 1 | 1 | 1 |
| E(1) | 1 | 1 | 1 |
| E(2) | 0 | 0 | 1 |
| F(1) 820c | 1 | 1 | 0 << L |
| F(2) |  |  |  |
| G(1) | 1 | 0 | 1 |
| G(2) | 0 | 0 | 1 |
| H(1): V⁻ | 0 | 1 | 0 |
| H(2): V⁺ | 1 | 1 | 0 |

TABLE III

Creating and detecting Transition from 0-0 to 1-0:

| Signal Point | Initial State Time = 0 | Intermediate State Time = 1 | Final State Time = 1 + Delay |
|---|---|---|---|
| A(1): V⁺ | 0 | 1 | 1 |
| A(2): V⁻ | 0 | 0 | 0 |
| B(1) | 1 | 0 | 0 |
| B(2) | 1 | 1 | 1 |
| C(1) | 0 | 1 | 1 |
| C(2) | 0 | 0 | 0 |
| D(1) 820a | 1 | 0 | 0 << J |
| D(2) 820b | 1 | 1 | 1 |
| E(1) | 1 | 1 | 1 |
| E(2) | 1 | 1 | 0 |
| F(1) 820c | 0 << L | 0 | 1 |
| F(2) | | | |
| G(1) | 1 | 1 | 1 |
| G(2) | 1 | 1 | 0 |
| H(1): V⁻ | 0 | 0 | 0 |
| H(2): V⁺ | 0 | 0 | 1 |

What is claimed is:

1. A method for sending information on a pair of conductors coupling a transmitter and receiver, each of the conductors having only two hardware states, comprising:
   a) sending some of the information by driving the pair of conductors in accordance with a primary signaling character set having two distinct information-carrying characters,
   b) sending other information by driving the pair of conductors in accordance with a third distinct information-carrying character represented by a distinct set of the hardware states of the pair of conductors different from any set of the hardware states used to define the primary signaling character set.

2. The method as recited in claim 1 wherein the two distinct information-carrying characters of the primary set are represented by transition conditions of the pair of conductors.

3. The method of claim 2 wherein
   one of the distinct information-carrying characters of the primary set is represented by a change in state of the pair of conductors; and
   the other of the distinct information-carrying characters of the primary set is represented by no change in state of the pair of conductors.

4. The method of claim 1 wherein the two distinct information-carrying characters are represented by state conditions of the pair of conductors.

5. The method as recited in claim 4 wherein
   one of the distinct information-carrying characters of the primary set is represented by a first predefined state of the pair of conductors; and
   the other of the information-carrying characters of the primary set is represented by a second predefined state of the pair of conductors.

6. The method as recited in claim 5 wherein
   the first state corresponds to the first conductor being in a high state and the second conductor being in a low state; and
   the second state corresponds to the first conductor being in a low state and the second conductor being in a high state.

7. The method as recited in claim 5 wherein any transition from the first state to the second state and vice-versa requires temporarily driving the pair of conductors to a putative state.

8. The method as recited in claim 7 wherein the putative state corresponds to either both the first conductor and the second conductor being in a high state, or both the first conductor and the second conductor being in a low state.

9. The method as recited in claim 1 wherein the third distinct information-carrying character corresponds to either both the first conductor and the second conductor being in a high state, or both the first conductor and the second conductor being in a low state.

10. The method as recited in claim 9 wherein the third distinct information-carrying character represents an end-of-message delimiter.

11. Apparatus for sending information on a pair of conductors between a transmitter and receiver, each of the conductors having no more than two hardware states, comprising:
   a transmitter connected to the pair of conductors, the transmitter sending some of the information by driving the pair of conductors in accordance with a primary signaling character set having two distinct information-carrying characters; and
   a secondary driver connected to the pair of conductors, the secondary driver sending other information by driving the pair of conductors in accordance with a third distinct information-carrying character represented by a distinct set of the hardware states of the pair of conductors different from any set of the hardware states used to define the primary signaling character set.

12. The apparatus as recited in claim 11 wherein the two distinct information-carrying characters of the primary set are represented by transition conditions of the pair of conductors.

13. The apparatus of claim 12 wherein
   one of the distinct information-carrying characters of the primary set is represented by a change in state of the pair of conductors; and
   the other of the distinct information-carrying characters of the primary set is represented by no change in state of the pair of conductors.

14. The apparatus of claim 11 wherein the two distinct information-carrying characters are represented by state conditions of the pair of conductors.

15. The apparatus as recited in claim 14 wherein
   one of the distinct information-carrying characters of the primary set is represented by a first predefined state of the pair of conductors; and
   the other of the information-carrying characters of the primary set is represented by a second state of the pair of conductors.

16. The apparatus as recited in claim 15 wherein
   the first state corresponds to the first conductor being in a high state and the second conductor being in a low state; and
   the second state corresponds to the first conductor being in a low state and the second conductor being in a high state.

17. The apparatus as recited in claim 15 wherein any transition from the first state to the second state and vice-versa requires temporarily driving the pair of conductors to a putative state.

18. The apparatus as recited in claim 17 wherein the putative state corresponds to either both the first conductor and the second conductor being in a high state, or both the first conductor and the second conductor being in a low state.

19. The apparatus as recited in claim 11 wherein the third distinct information-carrying character corresponds to either both the first conductor and the second conductor being in a high state, or both the first conductor and the second conductor being in a low state.

20. The apparatus as recited in claim 19 wherein the third distinct information-carrying character represents an end-of-message delimiter.

21. Apparatus for detecting information on a pair of conductors communicating data between a transmitter and receiver, each of the conductors having no more than two hardware states comprising:

the receiver connected to the pair of conductors, the receiver detecting some of the information on the pair of conductors in accordance with a primary signaling character set having two distinct information-carrying characters; and a secondary detector connected to the pair of conductors, the secondary detector detecting other information on the pair of conductors in accordance with a third distinct information-carrying character represented by a distinct set of the hardware states of the pair of conductors different from any set of the hardware states used to define the primary signaling character set.

22. The apparatus as recited in claim 21 wherein the two distinct information-carrying characters of the primary set are represented by transition conditions of the pair of conductors.

23. The apparatus of claim 22 wherein one of the distinct information-carrying characters of the primary set is represented by a change in state of the pair of conductors; and the other of the distinct information-carrying characters of the primary set is represented by no change in state of the pair of conductors.

24. The apparatus of claim 21 wherein the two distinct information-carrying characters are represented by state conditions of the pair of conductors.

25. The apparatus as recited in claim 24 wherein one of the distinct information-carrying characters of the primary set is represented by a first predefined state of the pair of conductors; and the other of the information-carrying characters of the primary set is represented by a second state of the pair of conductors.

26. The apparatus as recited in claim 25 wherein the first state corresponds to the first conductor being in a high state and the second conductor being in a low state; and the second state corresponds to the first conductor being in a low state and the second conductor being in a high state.

27. A method for sending information on a pair of conductors, each of the conductors having only two hardware states comprising:

a) sending some of the information by driving the pair of conductors in accordance with a primary signaling character set having two distinct information-carrying characters, each of the information-carrying characters being formed either by (1) the pair of conductors being in a particular set of the hardware states or (2) by the pair of conductors transitioning from one set of the hardware states to another; and b) sending other information by driving the pair of conductors in accordance with a third distinct information-carrying character, the third distinct information-carrying character corresponding to both the first conductor and the second conductor being in either a high state or a low state.

* * * * *